United States Patent [19]
Watanabe et al.

[11] Patent Number: 5,132,132
[45] Date of Patent: Jul. 21, 1992

[54] COATING METHOD FOR MAGNETIC RECORDING MEDIUM

[75] Inventors: Masaru Watanabe, Nishinomiya; Satoshi Hirose, Amagasaki, both of Japan

[73] Assignee: Matsushita Electric Industrial Co., Ltd., Osaka, Japan

[21] Appl. No.: 714,426

[22] Filed: Jun. 12, 1991

[30] Foreign Application Priority Data

Jun. 14, 1990 [JP] Japan ................................. 2-155953

[51] Int. Cl.$^5$ ............................................. H01F 10/02
[52] U.S. Cl. ................................... 427/131; 478/694; 478/900
[58] Field of Search ................ 427/131; 428/694, 900

[56] References Cited

FOREIGN PATENT DOCUMENTS 0329424 7/1990 European Pat. Off. .
62-124631 6/1987 Japan .

OTHER PUBLICATIONS

"Tosokogaku"; vol. 21 No. 10, pp. 475–479; 1986.

*Primary Examiner*—Bernard Pianalto
*Attorney, Agent, or Firm*—Lowe, Price, LeBlanc & Becker

[57] ABSTRACT

An apparatus for coating on a support a first magnetic coating solution so as to form a lower layer on the support continuously travelling and then coating a second magnetic coating solution on the first magnetic coating solution, which is in a non-dried state, so as to form an upper layer thereon to thereby produce a two-layer type magnetic recording medium. The apparatus comprises a first die for coating the first magnetic coating solution which includes first and second lip portions, the second lip portion having a top surface curved. The apparatus further comprises a second die for coating the second magnetic coating solution which includes first and second lip portions, the second lip portion similarly having a top surface curved. The first lip portion of each of said first and second dies has an edge A and the second lip portion has at both ends of the curved top surface edges B and C. The edge B is formed to be in confronting relation to the edge A of the first lip portion. The edge A of the first lip portion is arranged to be substantially on a tangential line of the edge B of the second lip portion and the support is arranged to be travelled so as to approach each die at a loading angle to be substantially parallel to the tangential line of the edge B of the second lip portion and to be separated therefrom at an unloading angle to be substantially parallel to an tangential line of the edge C of said second lip portion.

6 Claims, 3 Drawing Sheets

COATING METHOD FOR MAGNETIC RECORDING MEDIUM

BACKGROUND OF THE INVENTION

The present invention relates generally to a coating method and apparatus for magnetic recording media such as a magnetic tape and a floppy disk, and more particularly to such a coating method and apparatus for succesively forming two layers in a non-dried state.

In accordance with the requirement for heightening the performance of the magnetic recording media, there is recently noted a multi-layer-structurized magnetic recording medium such as a video magnetic recording medium having two magnetic layers. As the upper layer there is provided a magnetic layer for the high-density recording which has an excellent characteristic of magneto-electric conversion at a higher-frequency region, and as the lower layer there is provided a magnetic layer which has an excellent characteristic of magneto-electric conversion at a lower-frequency region. Unlike the conventional single-layer structure, this arrangement can realize a magnetic recording medium having an excellent characteristic of magneto-electric conversion over a wide region. In order to simplify the manufacturing process of such a two-layer video magnetic recording medium, it is preferable to form the two layers by performing the coating and drying at the same time as disclosed in the Japanese Patent Provisional Publication No. 62-124631.

There is a problem with such a conventional coating method and apparatus, however, in that fine stripes enlongated in the longitudinal directions of a support (a stripe pattern of uneven coating on the coating surface) can appear on the coated surface in cases where the high-density recording magnetic coating solution is coated repeatedly so as to form plural layers. This problem has been clearified by the study made by the inventors of this invention. FIG. 1 shows a coating result to be obtained by performing the calendering process after coating as the upper layer a magnetic coating solution as shown in a table 1 and successively coating as the lower layer a magnetic coating solution as shown in a table 2 on a polyethylene terephthalate film with a thickness of 14 μm in accordance with the conventional coating technique the magnetic coating solution for the upper layer being coated thereon so that the layer thickness is 0.5 μm in the dried state and the magnetic coating solution for the lower layer being coated thereon so that the layer thickness is 3 μm in the dried state. In FIG. 1, the coated surface is measured by means of a 3-dimension surface profile analizer. For making obvious the height portions of the coated surface for the 3-dimensional display, there are outputted only the portions higher than the average value in the height direction. According to the measurement result, the stripe pattern is seen on the coated surface at a pitch of about 50 μm in the longitudinal directions of the support (the base film). Further, in FIG. 1, the average surface roughness (RMS) of the coated surface has been seen to be 15.8 mm. When the characteristic of magneto-electric conversion is measured by means of a MII format deck, the video band output (7 MHz) is −2 dB with respect to the Applicant reference tape and the S/N ratio is −1 dB. It is clear from the aforementioned result that the longitudinally elongated stripes can extremely deteriorate the characteristic of magneto-electric conversion.

TABLE 1

| Magnetic Alloy Powder | | |
|---|---|---|
| Lengthwise Size | 0.18 μm | 100 wt % |
| Average Size Ratio | 1:12 | |
| σs | 128 emu/g | |
| Hc | 1530 Oe | |
| Conductive Carbon | | 2 wt % |
| Polyeurethane Resin | | 10 wt % |
| Chloroethylene-vinyl acetate copolymer | | 10 wt % |
| Alumina (α-Al$_2$O$_3$) | | 5 wt % |
| Stearic Acid | | 2 wt % |
| Butyle Stearic Acid | | 2 wt % |
| Methyle Ethyle Ketone | | 200 wt % |
| Toluene | | 180 wt % |
| Cyclohexanone | | 40 wt % |

According to the research of the inventors of this invention, this is due to the following causes. That is, the magnetic powder particles of the magnetic coating solution tend to be combined with each other by means of the magnetic suction force, and therefore they are not presented as the first-order particles but form 3-dimensional network structures. In response to a shearing force being applied, the 3-dimensional network structures can be considered to be broken so as to form flocculations having a given size ("Tosokogaku", Vol.21 No.10 P475–479, 1986). Since the magnetic coating solution including a magnetic powder such as an magnetic alloy powder having a strong magnetic force or a magnetic powder having a small lengthwise average size of acicular particle has an extremely strong cohesive force, the above-mentioned flocculations can be considered to be presented in the flowing magnetic coating solution in orders of several tens to hundred μm. When coating this magnetic coating solution on a support in accordance with the conventional coating technique, as illustrated in FIG. 2 the above-mentioned flocculation is pushed out from a liquid pocket of a die 5 onto a second lip 2. This causes the generation of the the stripe pattern of uneven coating on the coating surface. In FIG. 2, numeral 1 represents a first lip, 3 designates a manifold, 4 depicts a slit, 6 denotes a pump, 7 indicates a magnetic coating solution and 8 is a support. In addition, the generation of the stripe pattern tends to more easily and clearly occur as the magnetic powder of the magnetic coating solution to be coated has a stronger magnetic force and a smaller lengthwise average particle size of acicular particle. Recently, in order to meet the requirements to more heighten the recording density of the video magnetic recording medium, for the upper layer there is used a magnetic coating solution including an extremely fine magnetic powder having a high magnetic force. Thus, the characteristic of magneto-electric conversion such as the video band output and S/N is considerably deteriorated due to the stripe pattern of uneven coating on the coating surface, thereby dealing a fatal blow to the quality of the article.

SUMMARY OF THE INVENTION

It is therefore an object of the present invention to provide a coating method and apparatus which is capable of making smooth the coated surface of a multi-layer-structurized magnetic recording medium.

In accordance with the present invention, there is provided a method of coating on a support a first magnetic coating solution so as to form a lower layer on the support continuously travelling and then coating on the lower layer a second magnetic coating solution so as to form an upper layer thereon to thereby produce a two-layer type magnetic recording medium, the method comprising the steps of coating the first magnetic coating solution on the support by a first die including first and second lip portions which are in confronting relation to each other through a slit portion for supplying the first magnetic coating solution and coating the second magnetic coating solution thereon by a second die including first and second lip portions which are in confronting relation to each other through a slit portion for supplying the second magnetic coating solution, wherein the first lip portion of each of the first and second dies has an edge A formed at the slit side and the second lip portion of each of the first and second dies has at its top portion a curved surface so as to form edges B and C, the edge B being formed to be in confronting relation to the edge A of the first lip portion with the slit being interposed therebetween, the edge A of the first lip portion is arranged to be on a tangential line of the edge B of the second lip portion and the other portions of the first lip portion are arranged so as not to exceeds the tangential line of the edge B of the second lip portion, the support being travelled so as to approach the first or second die at a loading angle to be substantially parallel to the tangential line of the second lip portion and to be separated therefrom at an unloading angle to be substantially parallel to an tangential line of the edge C of the second lip portion.

In accordance with the present invention, there is further provided an apparatus for coating on a support a first magnetic coating solution so as to form a lower layer on the support continuously travelling and then coating a second magnetic coating solution on the first magnetic coating solution, which is in a non-dried state, so as to form an upper layer thereon to thereby produce a two-layer type magnetic recording medium, the apparatus comprising a first die for coating the first magnetic coating solution on the support, the first die including first and second lip portions which are in confronting relation to each other through a slit portion for supplying the first magnetic coating solution, the second lip portion having a top surface curved and the first magnetic coating solution being supplied from the slit portion up to the curved top surface of the second lip portion so as to be coated on the support, and the apparatus further comprising a second die for coating the second magnetic coating solution on the coated first magnetic coating solution, the second die including first and second lip portions which are in confronting relation to each other through a slit portion for supplying the second magnetic coating solution, the second lip portion of the second die having a top surface curved and the second magnetic coating solution being supplied from the slip portion up to the second-mentioned curved top surface so as to be coated thereon, the first lip portion of each of the first and second dies having an edge A formed at the slit side and the second lip portion of each of the first and second dies having at both ends of the curved top surface edges B and C arranged in the travelling direction of the support, the edge B being formed to be in confronting relation to the edge A of the first lip portion with the slit being interposed therebetween, the edge A of the first lip portion being arranged to be substantially on a tangential line of the edge B of the second lip portion and the other portions of the first lip portion are arranged so as not to exceeds the tangential line of the edge B of the second lip portion, the support being arranged to be travelled so as to approach each of the first and second dies at a loading angle to be substantially parallel to the tangential line of the second lip portion and to be separated therefrom at an unloading angle to be substantially parallel to an tangential line of the edge C of the second lip portion.

Preferably, an arc-length BC of the curved top surface of the second lip portion of each of the first and second dies in the travelling direction of the support is determined to be in the range of $2 \text{ mm} \leq BC \leq 7$ mm. The radius of curvature R of the curved top surface of the second lip of each of the first and second dies is determined to be in the range of $4 \text{ mm} \leq R \leq 20$ mm. Further, the length of the slit of the first and second dies in the travelling direction of the support is determined to be in a range of 0.1 mm and 0.5 mm, and a manifold is formed at a portion of the slit of the first and second dies and a length between the exit of the manifold and the top of the slit is determined to be in a range between 20 mm and 100 mm, and the first and second lip portions are respectively made of a cemented carbide. Still further, according to the present invention, the liquid pocket for the magnetic coating solution is formed only at a portion between the exit of the slit and the second lip top surface so as to generate a shearing force between the slit side edge B or top surface of the second lip portion and the support to break the generated flocculations.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 3:
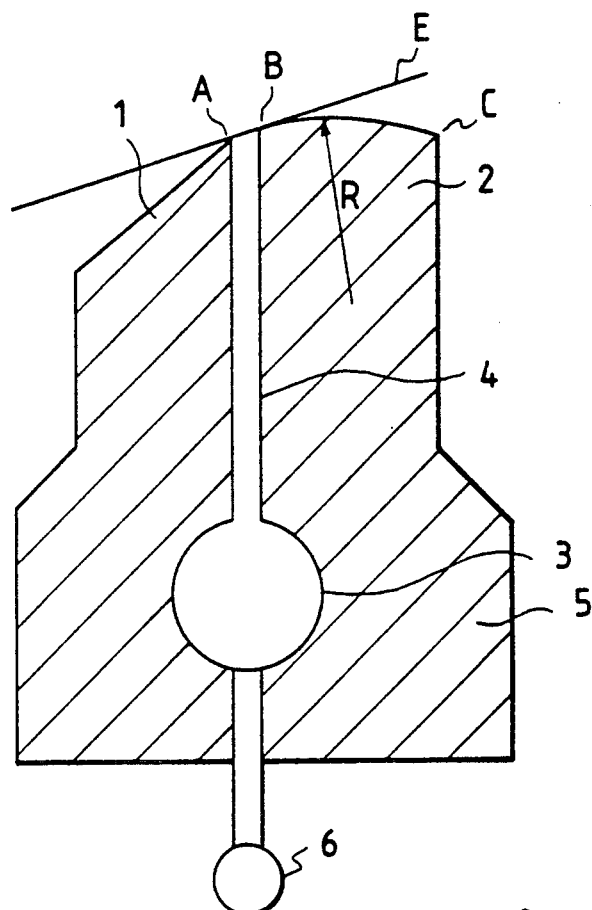
FIG. 3 is a cross-sectional view showing a die according to an embodiment of the present invention.

Referring now to FIG. 3, there is schematically illustrated a cross section of a first die for coating a magnetic coating solution on a support (base film). A second die substantially has the same structure as the first die and hence the description will be made only in terms of the first die. In FIG. 3, illustrated at numerals 1 and 2 are first and second lips, the top of the second lip 2 having a curved surface and its radius of curvature R being arranged to be 4 to 20 mm. The radius of curvature R is adequately determined under the conditions such as the viscosity of the magnetic coating solution, coating speed, coated-layer thickness and tension of the support. In the case that the radius of curvature R is below 4 mm, difficulty is encountered to float the support from the second lip 2 curved surface because the pressure to be applied to the coating solution from the support becomes excessive with respect to the coating solution flowing through between the second lip 2 curved surface and the support. On the other hand, in the case that the radius of curvature R is above 20 mm, difficulty is encountered to remove air from the coated layer because the pressure to be applied to the coating solution from the support becomes too small with respect to the coating solution flowing therebetween. The adequate determination of the radius of curvature R allows uniformly coating the coating solution with a predetermined thickness without involving air accompanied by the support.

As a material for the first and second lips 1 and 2 there is used a cemented carbide. The use of the cemented carbide permits finishing the straightness and flatness of the lips 1 and 2 in units of several $\mu m$ and further preventing burr and wear which can be developed at the exit end portion of the second lip 2 when machining a stainless steel, for example. As a result, even in the case of performing a thin film coating, the unevenness of the thickness in the width directions of the support does not occur and further lengthwise stripes on a coated film surface which can be developed due to the burr and wear of edge portions do not occur to allow adequate coating.

A manifold, illustrated at numeral 3, is arranged so as to penetrate the coating device in directions (coating width directions) perpendicular to the coating direction. The cross-sectional configuration of the manifold 3 may be arranged to be circular or semi-circular. Illustrated at numeral 4 is a slit whose gap length is generally set to be 0.1 to 0.5 mm and whose length in the width directions is substantially equal to the coating width of the coating device. In cases where the gap length thereof is below the aforementioned range, the hydrodynamic resistance of the coating solution flowing through the slit 4 becomes high whereby the discharge of the coating solution in the coating width directions becomes non-uniform so as to result in the unevenness of the film thickness in the coating width direction. Further, when the gap length is above the above-mentioned range, the flow of the coating solution is disordered at the exit end of the slit 4 so as to make it difficult to uniformly coat the coating solution. The length from the manifold 3 to the slit 3 exit may be determined under the conditions such as the viscosity of the coating solution (taking into account the thixotropic nature) and discharging amount of the coating solution from the coating device, generally 20 to 100 mm. The top configuration of a first lip 1 confronting the second lip 2 through the slit 4 is arranged to have any one selected from a curved surface, flat surface, polygon surface and others.

Figure 4:
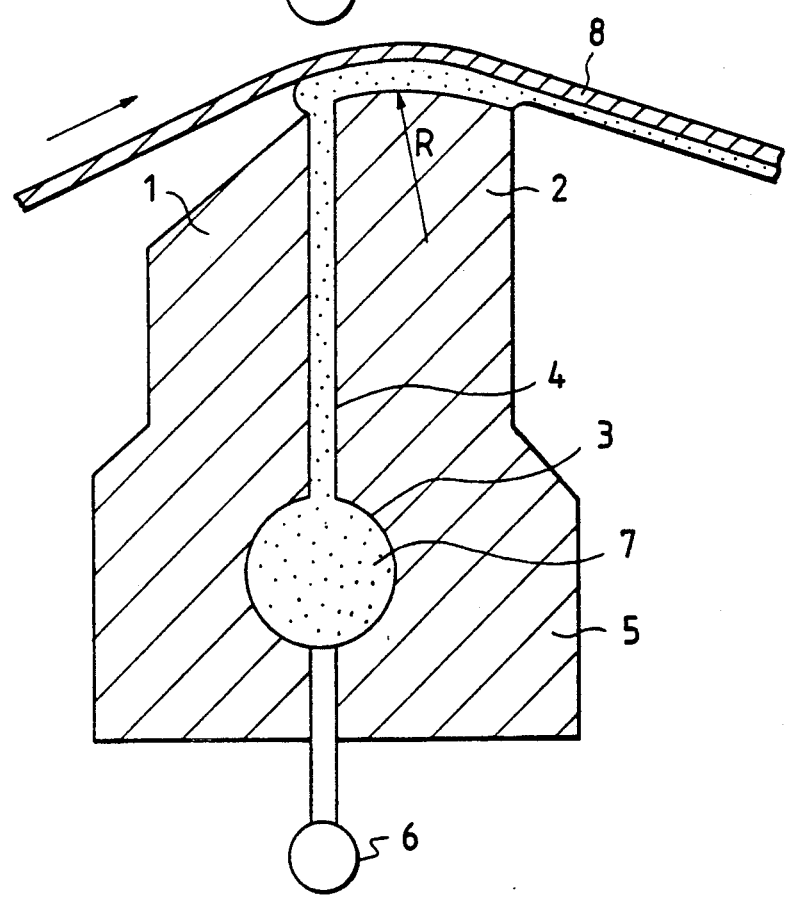
FIG. 4 is a cross-sectional view showing a coating state due to the die according to the embodiment of this invention.

FIG. 4 is a cross-sectional view of the first die 5 for describing a coating method and apparatus according to this embodiment where the coating is effected by a first die 5 for the lower layer. In FIG. 4, a support illustrated at numeral 8 approaches the die 5 at an angle (loading angle) so as to be substantially parallel to the tangential line E of a top point B of the second lip illustrated in FIG. 3. The adjustment of the loading angle angle of the support 8 to the die 5 is effected by a guide roller (not shown) provided at the upstream side of the first lip 1. The first lip 1 is arranged so that only its edge portion A is arranged to upwardly exceeds the tangential line E or be on the tangential line E as illustrated in FIG. 3. This arrangement prevents the first lip 1 from coming into contact with the support 8 so as to prevent damages of the support 8. Moreover, the support 8 separates from the die 5 at an angle (unloading angle) so as to be substantially parallel to the tangential line of the other edge portion C (see FIG. 3) of the second lip 2. The adjustment of the unloading angle of the support 8 is made by means of another guide roller (not shown) provided at the downstream side of the second lip 2. A magnetic coating solution 7 for the lower layer is successively supplied into the manifold 3 through a pump 6 by an coating amount for the support 8 and the coating solution is forced out by means of a liquid pressure in the manifold 3 through the slit 4 up to the outside of the die 5.

Here, as described above, in the coating solution 7 for the upper layer to be forced out in the subsequent coating process by the second die there are presented the flocculations comprising the magnetic powder particles. However, since the loading angle of the support 8 with respect to the die 5 is arranged as described above, the distance between the lower layer attached to the support 8 and the slit side edge portion B of the second lip 3 can be kept to be substantially twice the coated film thickness for the lower layer in the wet state. That is, since the distance therebetween is smaller as compared with the size of the flocculations, a strong shearing force is applied to the flocculations which are in turn broken finely so as to prevent the great flocculation from advancing onto the top surface of the second lip 2 as it is, thereby suppressing the generation of the above-described stripe pattern on the coated film surface.

Figure 1:
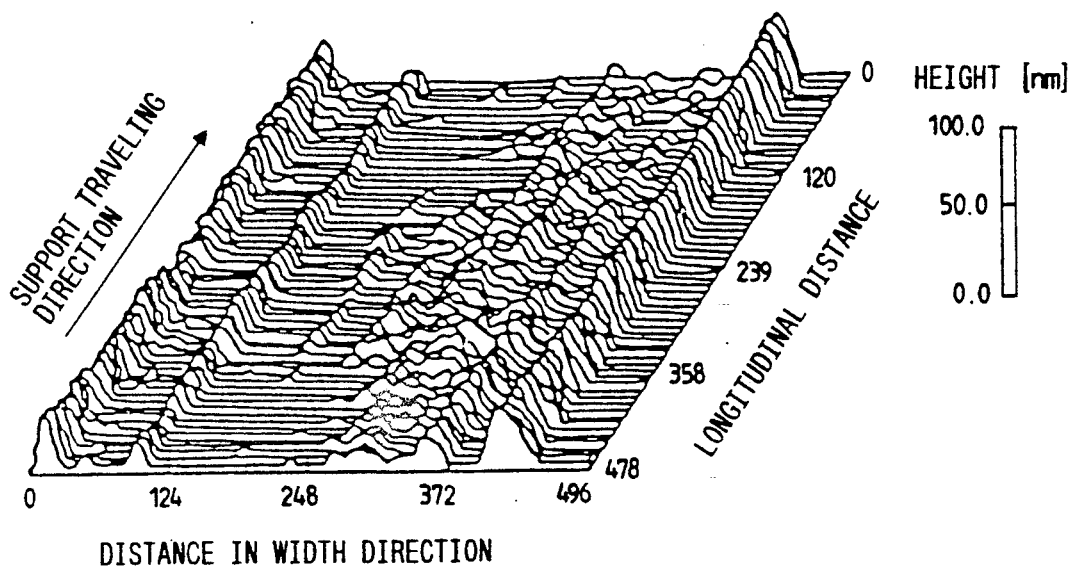
FIG. 1 is an illustration of a coated surface to be obtained in accordance with a conventional technique.
Figure 2:
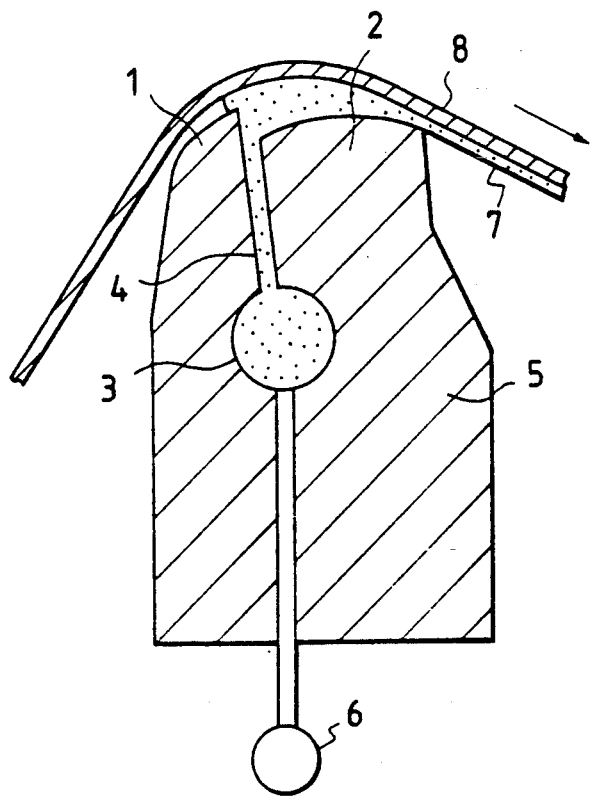
FIG. 2 is a cross-sectional view showing a coating state due to a conventional die.

In addition, according to the researches of this inventors, it is proven that the length BC of the second lip 2 top surface having an arc configuration greatly affects the smoothness of the coated surface and stability of the coating for the multi-layer-structurized magnetic recording medium. That is, in the case that the arc-length BC is shorter than 2 mm, since the time or distance for providing the shearing force with respect to the flocculations in the magnetic coating solution becomes short, it is impossible to sufficiently and finely break the flocculations whereby there is the possibility that there is remained the stripe pattern on the coated surface as illustrated in FIG. 1. On the other hand, when the arc-length BC is longer than 7 mm, the hydrodynamic resistance of the magnetic coating solution flowing through the gap between the support 8 and the second lip 2 curved surface excessively becomes great so as to generate the film thickness unevenness in the coating width directions to impede the stable coating thereon. Thus, the second lip 2 surface arc-length BC is preferable to be determined to be in a range of $2\ mm \leq BC \leq 7\ mm$, thereby effectively suppressing the stripe pattern of uneven coating on the coating surface. Similarly, in the case of coating the upper layer by the second die, this arrangement permits preventing the generation of the stripe pattern.

EXAMPLE 1

After the magnetic coating solution for the lower layer as shown in the Table 2 is coated by the first die 5 on the support 8 continuously travelling so that the thickness of the film in the dried state becomes 3 $\mu m$, the magnetic coating solution for the upper layer as shown in the Table 1 is coated by the second die so that the thickness of the film in the dried state becomes 0.5 $\mu m$. The first and second dies are separated by 1 m from each other. The support 8 used is made of polyethylene terephthalate film and arranged to have a thickness of 14 $\mu m$, and the coating speed is 100 m/min, and the support tension is 200 g/cm. The radius of curvature R of the second lip 2 of the first die 5 is set to be 5 mm and the radius of curvature of the second lip of the second die is also set to be 5 mm.

TABLE 2

| Magnetic Alloy Powder | | |
| --- | --- | --- |
| Lengthwise Size | 0.2 μm | 100 wt % |
| Average Size Ratio | 1:10 | |
| σs | 75 emu/g | |
| Hc | 750 Oe | |
| Conductive Carbon | | 1 wt % |
| Polyeurethane Resin | | 10 wt % |
| Chloroethylene-vinyl acetate copolymer | | 10 wt % |
| Alumina (α-Al$_2$O$_3$) | | 5 wt % |
| Stearic Acide | | 2 wt % |
| Butyle Stearic Acid | | 1 wt % |
| Methyle Ethyle Ketone | | 200 wt % |
| Toluene | | 200 wt % |

The arc-length BC of the second lip of the second die is fixedly set to be 3 mm and the arc-length BC of the second lip 2 of the first die 5 is changed as shown in the following Table 3.

TABLE 3

| Arc-Length BC (mm) | 1.5 mm | 2 mm | 7 mm | 8 mm |
| --- | --- | --- | --- | --- |

Figure 5:
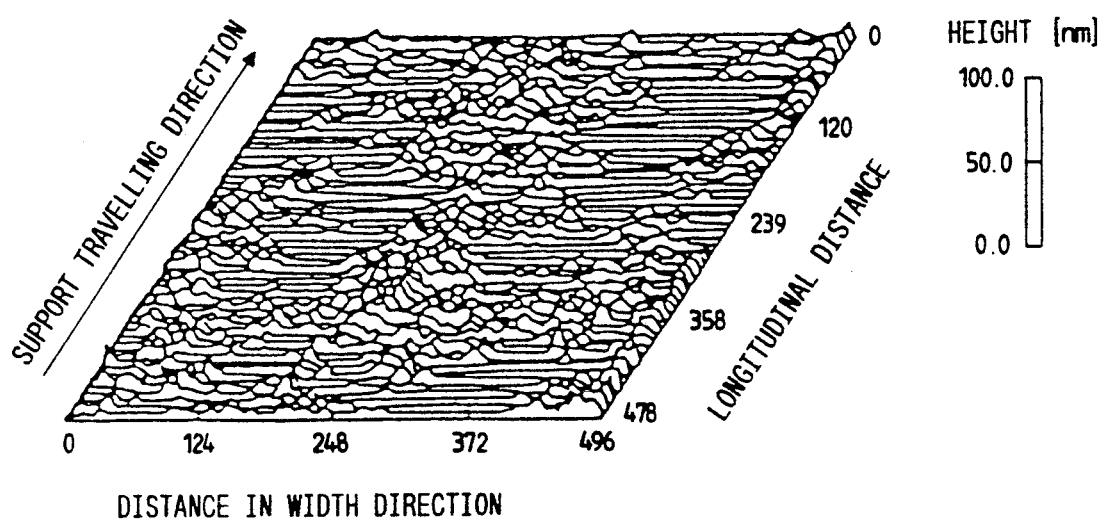
FIG. 5 is an illustration of a coated surface to be obtained in accordance with the embodiment of this invention.

After coated and oriented in the support travelling direction, the drying process is performed. After dried, the smoothing process of the magnetic layer surface is effected by means of a calender and the magnetic layer is slit so as to have a predetermined width to thereby form a magnetic tape. In the case of BC=8 mm, the film thickness unevenness occurs in the coating width directions. The coating surfaces of tapes formed with BC=1.5, 2 and 7 mm are measured by means of a 3-dimension surface profile analizer. In the measurement results, in the case of BC=1.5 mm, a stripe pattern of uneven coating as illustrated in FIG. 1 is generated on the coating surface. This is considered as the stripe pattern of uneven coating of the lower layer surface coated and formed by the first die provides the influence up to the upper layer. In the case of BC=2 or 7 mm there is no generation of the stripe pattern of uneven coating. For instance, the coating surface state obtained in the case of BC=2 mm becomes as illustrated in FIG. 5. Unlike the state as illustrated in FIG. 1, there is no stripe pattern of uneven coating on the coating surface, thereby allowing a multi-layer-structurized magnetic recording medium with an extremely smooth coating surface.

A table 4 shows the measurement results, using the MII format deck, of the characteristics of magneto-electric conversion, i.e., the S/N ratio and output at the video band frequency 7 MHz, with respect to the magnetic recording media produced according to this embodiment and the magnetic recording medium produced according to the conventional coating technique. For the measurements of the characteristics of magneto-electric conversion, in order to make the comparison easy, a MII tape produced by this applicant is used as the reference tape. In the table 4 there are also shown surface roughnesses (RMS) measured by means of the 3-dimension surface profile analizer.

TABLE 4

| | Characteristic of Magneto-Electric Conversion | | |
| --- | --- | --- | --- |
| | BC (mm) | S/N Ratio | Output (7 MHz) | RMS |
| Example 1 | BC = 1.5 | −1.0 dB | −1.5 dB | 13.7 nm |
| | BC = 2 | +0.5 dB | +1.0 dB | 4.6 nm |
| | BC = 7 | +0.5 dB | +1.0 dB | 5.0 nm |
| | BC = 8 | Uneven Coating | | |
| Conventional Tape | | −1.0 dB | −2.0 dB | 15.8 nm |
| Reference Tape | | 0 dB | 0 dB | 7.0 nm |

Since the coating surfaces of the tapes produced according to the coating technique of this embodiment, i.e., produced by the dies with the arc-lengths BC of 2 and 7 mm, are considerably smooth, as compared with that of the tape produced by the die with BC=1.5 or produced according to the conventional coating technique, the surface roughness (RMS) is smaller and the reproduction output and S/N ratio are extremely superior.

EXAMPLE 2

After the magnetic coating solution for the lower layer as shown in the table 2 is coated by the first die on a support continuously travelling so that the film thickness in the dried state becomes 3 μm, the magnetic coating solution for the upper layer as shown in the table 1 is coated thereon by the second die so that the film thickness in the dried state becomes 0.5 μm. The distance between the first and second dies is set to be 1 m. The support used is made of a polyethylene terephthalate film and arranged to have a thickness of 14 μm, and the coating speed is 100 m/min, and the support tension is 200 g/cm. The radius of curvature R of the second lip of the first die is set to be 15 mm and the radius of curvature of the second lip of the second die is also set to be 15 mm. The arc-length BC of the second lip of the first die is fixedly set to be 3 mm and the arc-length BC of the second lip of the second die is changed as shown in the following Table 5.

TABLE 5

| Arc-Length BC (mm) | 1.5 mm | 2 mm | 7 mm | 8 mm |
| --- | --- | --- | --- | --- |

After coated and oriented in the support travelling direction, the drying process is performed. After dried, the smoothing process of the magnetic layer surface is effected by means of a calender and the magnetic layer is slit so as to have a predetermined width to thereby form a magnetic tape. In the case of BC=8 mm, the film thickness unevenness occurs in the coating width directions. The coating sufaces of tapes formed with BC=1.5, 2 and 7 mm are measured by means of a 3-dimension surface profile analizer. In the measurement results, in the case of BC=1.5 mm, a stripe pattern of uneven coating as illustrated in FIG. 1 is generated on the coating surface. In the case of BC=2 or 7 mm there is no generation of the stripe pattern of uneven coating. For instance, the coating surface state obtained in the case of BC=2 mm substantially becomes as illustrated in FIG. 5. Unlike the state as illustrated in FIG. 1, according to this embodiment, there is no stripe pattern of uneven coating on the coating surface, thereby allowing a multi-layer-structurized magnetic recording medium with an extremely smooth coating surface.

A table 6 shows the measurement results, using the MII format deck, of the characteristics of magneto-electric conversion, i.e., the S/N ratio and output at the video band frequency 7 MHz, with respect to the magnetic recording media produced according to this embodiment and the magnetic recording medium produced according to the conventional coating technique. For the measurements of the characteristics of magneto-electric conversion, in order to make the comparison easy, a MII tape produced by this applicant is used as the reference tape. In the table 6 there are also shown surface roughnesses (RMS) measured by means of the 3-dimension surface profile analizer. Since the coating surfaces of the tapes produced according to the coating technique of this embodiment, i.e., produced by the dies with the arc-lengths BC of 2 and 7 mm, are considerably smooth, as compared with that of the tape produced by the die with BC=1.5 mm or produced according to the conventional coating technique, the surface roughness (RMS) is smaller and the reproduction output and S/N ratio are extremely superior.

COMPARISON EXAMPLE

In accordance with the conventional coating technique, the magnetic coating solution for the upper layer as shown in the table 1 is coated on a support so that the film thickness in the fried state becomes 0.5 μm and the magnetic coating solution for the lower layer as shown in the table 2 is coated thereon so that the film thickness in the dried state becomes 3 μm. The support used is made of a polyethylene terephthalate film and arranged to have a thickness of 14 μm, and the coating speed is 100 m/min, and the support tension is 200 g/cm. After being calender-processed, it is cut so as to produce a tape. The coating surface of the tape obtained is measured by the 3-dimension surface profile analizer. The measurement result becomes as illustrated in FIG. 1. Further, the characteristics of magneto-electric conversion such as S/N ratio and output at the frequency 7 MHz result is being as shown in the tables 4 and 6.

TABLE 6

| | Characteristic of Magneto-Electric Conversion | | |
|---|---|---|---|
| BC (mm) | S/N Ratio | Output (7 MHz) | RMS |
| Example 2 | | | |
| BC = 1.5 | −1.0 dB | −1.5 dB | 14.2 nm |
| BC = 2 | +0.5 dB | +1.0 dB | 4.8 nm |
| BC = 7 | +0.5 dB | +1.0 dB | 4.9 nm |
| BC = 8 | Uneven Coating | | |
| Conventional Tape | −1.0 dB | −2.0 dB | 15.8 nm |
| Reference Tape | 0 dB | 0 dB | 7.0 nm |

It should be understood that the foregoing relates to only preferred embodiments of the present invention, and that it is intended to cover all changes and modifications of the embodiments of the invention herein used for the purposes of the disclosure, which does not constitute departures from the spirit and scope of the invention.

What is claimed is:

1. A method of coating on a support a first magnetic coating solution so as to form a lower layer on said support continuously travelling and then coating on said lower layer a second magnetic coating solution so as to form an upper layer thereon to thereby produce a two-layer type magnetic recording medium, said method comprising the steps of coating said first magnetic coating solution on said support by a first die including first and second lip portions which are in confronting relation to each other through a slit portion for supplying said first magnetic coating solution and coating said second magnetic coating solution thereon by a second die including first and second lip portions which are in confronting relation to each other through a slit portion for supplying said second magnetic coating solution, wherein said first lip portion of each of said first and second dies has an edge A formed at the slit side and said second lip portion of each of said first and second dies has at its top portion a curved surface so as to form edges B and C, said edge B being formed to be in confronting relation to said edge A of said first lip portion with said slit being interposed therebetween, said edge A of said first lip portion is arranged to be on a tangential line of said edge B of said second lip portion and the other portions of said first lip portion are arranged so as not to exceeds said tangential line of said edge B of said second lip portion, said support being travelled so as to approach said first or second die at a loading angle to be substantially parallel to said tangential line of said second lip portion and to be separated therefrom at an unloading angle to be substantially parallel to an tangential line of said edge C of said second lip portion.

2. A method as claimed in claim 1, wherein an arc-length BC of said curved surface of said second lip portion of each of said first and second dies in the travelling direction of said support is determined to be in the following range:

2 mm ≦ BC ≦ 7 mm.

3. A method as claimed in claim 1, wherein the radius of curvature R of said curved surface of said second lip of each of said first and second dies is determined to be in the following range:

4 mm ≦ R ≦ 20 mm.

4. A method as claimed in claim 1, wherein the length of said slit of said first and second dies in the travelling direction of said support is determined to be in a range of 0.1 mm and 0.5 mm.

5. A method as claimed in claim 1, wherein a manifold is formed at a portion of said slit of said first and second dies and a length between the exit of said manifold and the top of said slit is determined to be in a range between 20 mm and 100 mm.

6. A method as claimed in claim 1, wherein said first and second lip portions are respectively made of a cemented carbide.

* * * * *